US006784400B1

(12) United States Patent
Banks et al.

(10) Patent No.: US 6,784,400 B1
(45) Date of Patent: Aug. 31, 2004

(54) METHOD OF SHORT PULSE HOLE DRILLING WITHOUT A RESULTANT PILOT HOLE AND BACKWALL DAMAGE

(76) Inventors: Paul S. Banks, 951 Hawthorne Ct., San Marcos, CA (US) 92069; Brent C. Stuart, 2192 Harvest Pl., Livermore, CA (US) 94550; Michael D. Perry, 15355 Eastvale Rd., Poway, CA (US) 92064

( * ) Notice: Subject to any disclaimer, the term of this patent is extended or adjusted under 35 U.S.C. 154(b) by 0 days.

(21) Appl. No.: 10/377,902

(22) Filed: Mar. 3, 2003

(51) Int. Cl.[7] ............................................. B23K 26/00
(52) U.S. Cl. .............................. 219/121.69; 219/121.7
(58) Field of Search .................. 219/121.69, 121.7, 219/121.68, 121.67, 121.71, 121.85

(56) References Cited

U.S. PATENT DOCUMENTS 6,268,586 B1 * 7/2001 Stuart et al. ............ 219/121.72

6,552,301 B2 * 4/2003 Herman et al. ........ 219/121.71

* cited by examiner

Primary Examiner—M. Alexandra Elve
(74) Attorney, Agent, or Firm—Bachman & LaPointe, P.C.

(57) ABSTRACT

A method for removing material via a laser so as to reduce the formation of channels comprising the steps of emitting a laser pulse comprising a pulse energy, a pulse duration, and a fluence towards a surface of a drilling material the fluence of a value sufficient to avoid the formation of a channel in the drilling material at the surface to form a hole comprising a side wall and a bottom, shaping a spatial profile of the laser pulse such that the fluence is substantially uniform across the spatial profile; and emitting at least one subsequent laser pulse having a pulse energy, a pulse duration, and a fluence sufficient to avoid the formation of a channel at the bottom of the hole.

11 Claims, 2 Drawing Sheets

METHOD OF SHORT PULSE HOLE DRILLING WITHOUT A RESULTANT PILOT HOLE AND BACKWALL DAMAGE

BACKGROUND OF THE INVENTION (1) Field of the Invention

The present invention relates to an apparatus and a method of drilling metal with short pulses of energy so as to minimize the formation of channels or filaments in the drilled hole.

(2) Description of Related Art

For ultrashort-pulse laser drilling of a hole, a small channel (20–80 µm in diameter) can be formed near the peak of the incident laser fluence at the bottom of features being drilled or cut. In stainless steel, this channel is formed for fluences above approximately 5 J/cm^2. Within this channel, the material removal rate can be much higher than that for the region surrounding the channel. Removal of the material gives rise to a filament extending below the surface of the hole. As used herein, "ultrashort-pulse laser drilling" refers to drilling with an ultrashort pulse laser producing a laser pulse with a duration less than 20 picoseconds.

With reference to FIG. 1, there is illustrated an idealized cross section of an ultrashort-pulse laser drilled hole 10, during the process of drilling, exhibiting the above noted characteristics. The distance from the surface 17 of the drilling material 13 to the rough bottom 15 of the hole 10 is designated "a". The distance from the highest to lowest points of the bottom 15 of the rough hole 10 is designated "b". The distance from the outer surface 17 of the drilling material 13 to the bottom of the filament 19 is designated by "c".

It is important to control the creation and propagation of this small filament because its occurrence increases the likelihood of backwall damage in certain drilling applications. When the filament 19 breaks through the back surface 21 of the drilling material 13 quickly, laser light impinges on any material behind the work piece for significant amounts of time. Elimination of this type of filament growth will enable termination of the drilling process shortly after the hole bottom 15 reaches the back side of the work piece, thus forming the hole 10.

What is therefore needed is a method for laser drilling holes and slots in metal which substantially reduces or eliminates the formation of filaments.

SUMMARY OF THE INVENTION

Accordingly, it is an object of the present invention to provide a method of drilling metal with short pulses of laser energy so as to minimize the formation of channels or filaments in the drilled hole.

In accordance with the present invention, a method for removing material via a laser so as to reduce the formation of channels comprises the steps of emitting a laser pulse comprising a pulse energy, a pulse duration, and a fluence towards a surface of a drilling material the fluence of a value sufficient to avoid the formation of a channel in the drilling material at the surface to form a hole comprising a side wall and a bottom, shaping a spatial profile of the laser pulse such that the fluence is substantially uniform across the spatial profile; and emitting at least one subsequent laser pulse having a pulse energy, a pulse duration, and a fluence sufficient to avoid the formation of a channel at the bottom of the hole.

DETAILED DESCRIPTION OF THE PREFERRED EMBODIMENT(S)

By shaping the incident laser beam spatial profile and controlling the fluence incident on the bottom of the main feature (hole or slot), the formation of a filament and the subsequent rapid breakthrough of the laser light through the drilling material is either reduced or eliminated.

The present invention describes a method to avoid the formation of the above-described channels. The channels can form at incident fluences of approximately 5 J/cm^2 in stainless steel and aluminum. They do not occur until higher fluences in copper. The onset is material dependent, but likely to be in the range of 2–30 J/cm^2. Other preferred materials include nickel based superalloys and nickel based single crystal alloys.

The channel formation can be avoided by 1) reducing the incident energy density to ensure that it is below the threshold for channel formation in the material being drilled, 2) shaping the spatial profile of the incident laser beam so that the entire beam is at a uniform fluence, and/or 3) starting the drilling/cutting process at lower fluence and gradually increase the pulse energy as the depth of the hole/slot increases.

Figure 2:
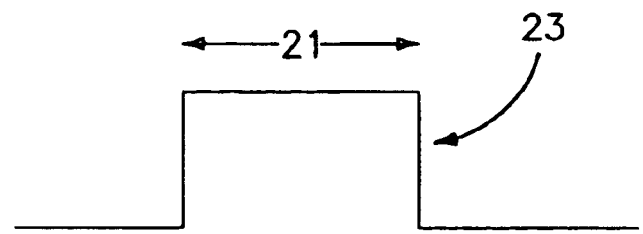
FIG. 2 A cross-section of a preferred spatial profile of a laser pulse of the present invention.

With reference to FIG. 2, there is illustrated a spatial profile 23 for the incident laser beam. A preferred spatial profile 23 for the incident laser beam is a tophat where the fluence is approximately uniform across the entire beam width 21. The peak fluence for this profile is less than that for the gaussian profile typical of lasers (for the same total pulse energy and same diameter at 1/e^2 point). There is also no region of high fluence to preferentially induce the formation of the small channels and filaments. Beyond this, for deeper holes, some of the energy of the incident laser pulse is absorbed in the hole/slot walls. In another preferred embodiment, the spatial profile 23 is shaped to compensate for energy loss near the edges of the hole being drilled to ensure uniformity in deeper holes. In a preferred embodiment, the wavelength of the incident laser beam is approximately 1.03 µm. A preferred pulse duration of each laser beam is less than 10 psec, preferably less than 1 psec. A preferable laser type is a chirped pulse amplification (CPA) ultrashort laser.

As noted above, there is energy loss into the walls of a hole/slot 10 as the short-pulse beam propagates into a hole/slot 10 that is already formed. Thus, in deep holes/slots 10, the energy reaching the bottom of the hole 10 can be significantly less than the energy incident on the workpiece. It has been observed that the removal rate of material 13 does not increase with fluence or fluences above 0.5–4 J/cm^2, again depending on the material. It is therefore advantageous to begin drilling/cutting at fluences below the threshold for formation of the channels and to gradually increase the pulse energy as the hole/slot is drilled/cut. The rate of increase in pulse energy is such that the fluence on the hole/slot bottom is less than the threshold for the channel formation after the loss of energy into the walls, i.e., so that the fluence incident on the hole/slot bottom is always just below the channel formation threshold fluence.

A more thorough understanding of the parameters involved in such drilling may be gained through examination of the following example.

EXAMPLE I

Several holes were drilled in 900 μm thick stainless. steel. The holes were drilled for 5, 10, 15, 25, and 30 seconds (2 holes for each exposure time) at normal incidence and 10 J/cm2 (2 W, 1 kHz, 150 fs). The polarization was circular (using a zero-order quarter waveplate) and the focusing lens' focal length was 33 cm. The transmission of the laser entrance window by the end of the set of holes was about 80%. The laser spatial profile was gaussian with a diameter of about 230 μm (at $1/e^2$ points).

Figure 1:
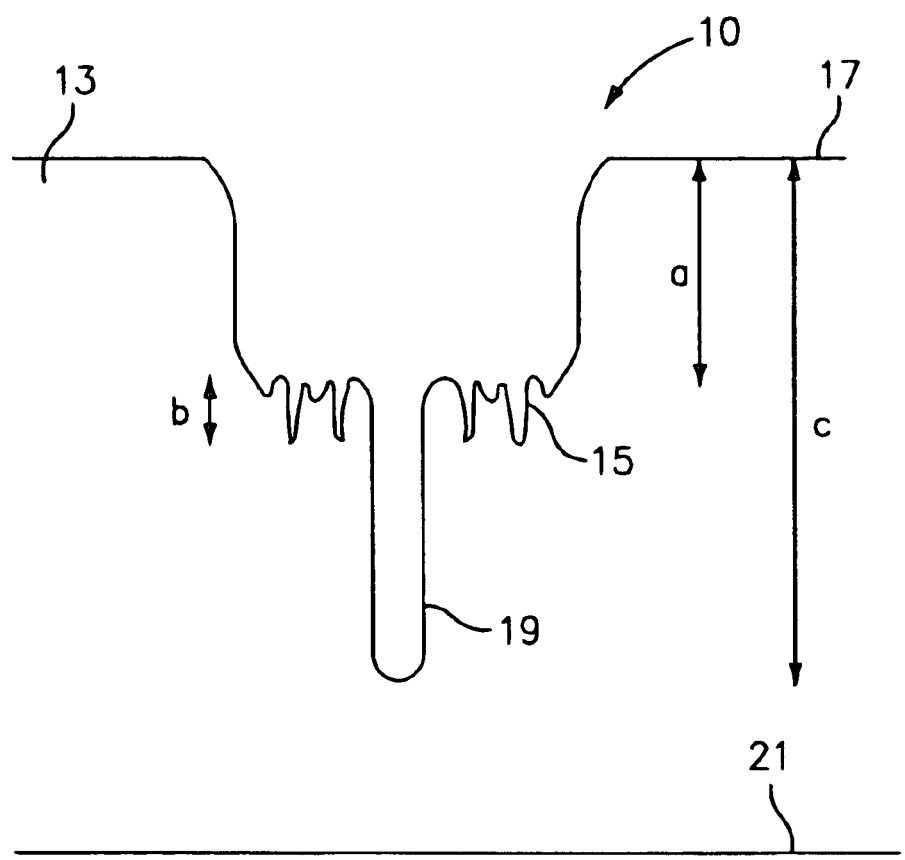
FIG. 1 A cross-section illustrating the morphology of laser drilled holes.

The part was removed and examined under the microscope. Each hole was approximately 400–430 μm in diameter at the entrance surface with the increase in diameter from the 5 s holes to the 30 s holes being about 20–30 μm. The holes exhibited an interior morphology as shown in cross section in FIG. 1. As noted, the holes comprise a large diameter hole which extends a depth "a" into the part, ending in a rough-textured bottom 15. Then there is a small diameter hole located near the center of the hole, or filament 19, which extends much deeper (a distance "c") into the part. This morphology was observed for all holes up to 20 s exposure time (20,000 pulses). For all of these cases, the diameter of the small, deep hole was 70–80 μm measured at its entrance.

The vertical encoder on the light microscope was used to measure the depths of each of these features at the different exposure times. The depths measured were consistent between the two holes drilled at each exposure setting. The results are as follows ("b" refers to the distance from the highest point of this rough bottom 15 to the lowest point):

| Exposure time (s) | a (μm) | b (μm) | c (μm) |
|---|---|---|---|
| 5 | 120 | 50 | 350 |
| 10 | 290 | 70 | 570 |
| 15 | 450 | 60 | 900 (thru part) |
| 20 | 610 | 120 | 900 (thru part) |
| 25 | 900 | n/a | n/a |
| 30 | 900 | n/a | n/a |

Figure 3:
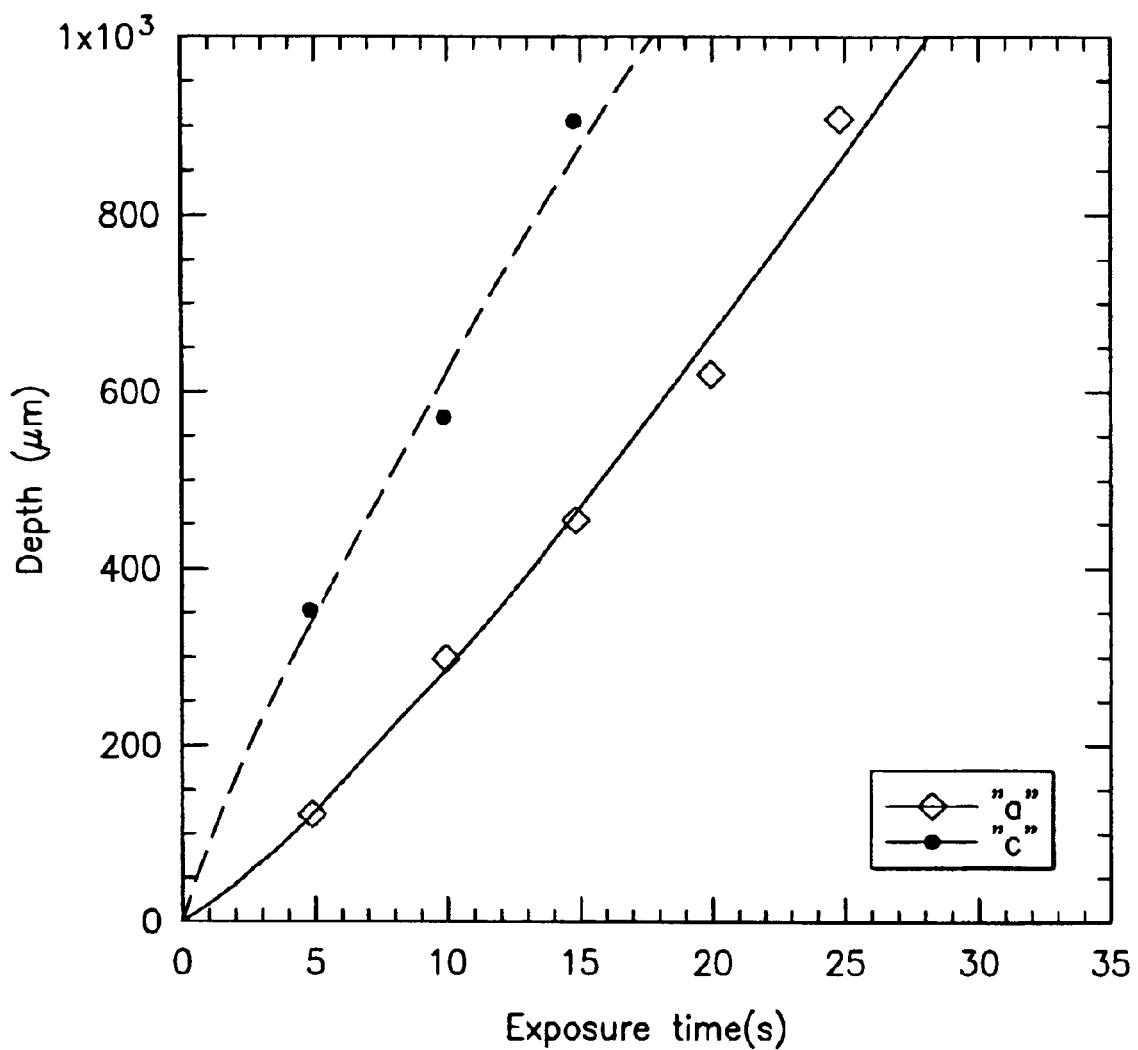
FIG. 3 A plot of hole depth and filament formation in a laser drilled hole.

The depths "a" and "c" are plotted against laser exposure time in FIG. 3. By 25 seconds, the hole had completely punched through drilling material 13, leaving only smooth side walls. The temporal evolution of the depths "a" and "c" is shown in FIG. 3 along with power law fits. Qualitatively, it has been observed that increasing the fluence by increasing the pulse energy decreases the time for first breakthrough but does not seem to significantly affect the time required to create a "clean" hole. This indicates that higher fluence increases the growth rate of the filament ("c") but has much less effect on the growth rate of the main hole ("a").

It is apparent that there has been provided in accordance with the present invention a method of drilling metal with short pulses of laser energy so as to minimize the formation of channels or filaments in the drilled hole which fully satisfies the objects, means, and advantages set forth previously herein. While the present invention has been described in the context of specific embodiments thereof, other alternatives, modifications, and variations will become apparent to those skilled in the art having read the foregoing description, Accordingly, it is intended to embrace those alternatives, modifications, and variations as fall within the broad scope of the appended claims.

What is claimed is:

1. A method for removing material via a laser so as to reduce the formation of channels comprising the steps of:

emitting a laser pulse comprising a pulse energy, a pulse duration, and a fluence towards a surface of a drilling material said fluence of a value sufficient to avoid the formation of a channel in said drilling material at said surface to form a hole comprising a side wall and a bottom;

shaping a spatial profile of said laser pulse such that said fluence is substantially uniform across said spatial profile; and emitting at least one subsequent laser pulse having a pulse energy, a pulse duration, and a fluence sufficient to avoid the formation of a channel at said bottom of said hole.

2. The method of claim 1 wherein shaping said spatial profile of said laser pulse comprises shaping said spatial profile to form a tophat.

3. The method of claim 1 wherein said drilling material is selected from the group consisting of stainless steel, aluminum, nickel based superalloys, nickel based single crystal alloys, and copper.

4. The method of claim 1 wherein said fluence at which said laser pulse is emitted is between 2 and 30 $J/cm^2$.

5. The method of claim 1 wherein said fluence at which said laser pulse is emitted is less than 5 $J/cm^2$.

6. The method of claim 1 wherein shaping said spatial profile of said laser pulse comprises shaping said spatial profile of at least one of said subsequent laser pulses such that said fluence is substantially uniform across said bottom of said hole.

7. The method of claim 1 wherein said pulse duration during which said laser pulse is emitted is less than 10 psec.

8. The method of claim 1 wherein said pulse duration during which said laser pulse is emitted is less than 1 psec.

9. The method of claim 1 wherein said emitting a laser pulse comprises emitting said laser pulse at a wavelength between 1 and 1.06 μm.

10. The method of claim 1 wherein said emitting a laser pulse comprises emitting said laser pulse at a wavelength approximately 1.03 μm.

11. The method of claim 1 wherein said emitting a laser pulse comprises emitting said laser pulse from a chirped pulse amplification ultrashort laser.

\* \* \* \* \*